Sept. 4, 1962   V. F. VOLK ETAL   3,052,751
AERIAL CABLE SPACER AND LINER FOR SAME
Filed March 22, 1960

INVENTORS
VICTOR F. VOLK
CHARLES D. EASH
BY JOHN W OLSON
Pennie, Edmonds, Morton, Barrows
and Taylor Attorney

3,052,751
AERIAL CABLE SPACER AND LINER FOR SAME

Victor F. Volk, Hastings on Hudson, N.Y., Charles D. Eash, Marion, Ind., and John W. Olson, Dobbs Ferry, N.Y., assignors to Anaconda Wire and Cable Company, a corporation of Delaware
Filed Mar. 22, 1960, Ser. No. 16,872
5 Claims. (Cl. 174—146)

Our invention relates to spacers for supporting and separating the conductors of electric power cables, and particularly to spacers for suspending the phase conductors of a distribution line from a messenger.

Spacers for aerial cables are expected to have a long service life in spite of the fact that they are exposed to extremes of weather and may be required to support heavy loads of wind or ice. The aerial cables supported by the spacers of this invention may operate at electrical potentials in excess of 15 kv. At these high voltages, an atmosphere rich in ozone may be generated in proximity to the spacers and they will be required to resist electrical arcing.

Requirements for reliability have been coupled with equally stringent demands for low cost, light weight, simplicity, and ease of installation. Prior art spacers have all failed in one or more of these requirements and demands.

In order to meet the requirement for high strength some spacers have been formed of a combination of facing plates locked together by some mechanism of more or less complexity. Such structures have been unduly complicated, expensive and heavy and in addition have tended to trap moisture between the plates following snow or rain. This moisture, which does not evaporate as freely as from an open surface, provides a low resistance path for electrical discharges. An electrical tracking path may also be provided by dust and foreign particles that accumulate between the plates. This dust is not washed away by rain and wind as it would be if it were on an exposed surface. The known types of spacer require rubber or neoprene bushings to adapt a standard spacer to different sizes of cables and messengers. This has resulted in the threefold disadvantage that the bushings require extra time to assemble in the field, that a different size bushing has to be stocked for each cable size, and that the plasticizer used in the material of the bushing will bleed eventually into the spacer material where it has an adverse effect on the strength of the latter.

This application is a continuation-in-part of our copending application, Setrial No. 832,931, filed Aug. 11, 1959.

It is an object of our invention to provide a spacer that is self cleaning and provides a maximum resistance to electrical tracking while, at the same time, maintaining high strength.

It is a further object of our invention to provide a spacer adapted to a wide range of different cable and messenger sizes without requiring special fittings.

Another object of our invention is to provide an abrasion resistant liner that will be adaptable to the entire range of cable sizes.

These desirable features are achieved by a spacer formed in one unit from dielectric material. The frame portion of the spacer is planar and in the general form of a diamond with hooks extending from its corners. The hooks are flanged to form seats wider than the frame portion, one of the hooks being curved downwardly for hanging the spacer onto a messenger and the others curved upwardly for supporting cables. The seats of the hooks are saddle-shaped so that the messenger and cables are in contact with contours rounded to conform approximately to the natural curve of the spans.

The spacers are formed with apertures contiguous to each hook so that the cables and messenger can be fastened with tie wires or other means passing through the apertures. The hooks terminate in a bulbous expansion that facilitates the clamping of liners for the seats to the hooks. These liners are formed from curved sheets of abrasion resistant material such as stainless steel with one end bifurcated and folded back on the convex side of the curved sheet and the other end provided with tabs that are also folded back.

The various features of our invention can best be understood by reference to the accompany drawing. In the drawing.

Figure 1:
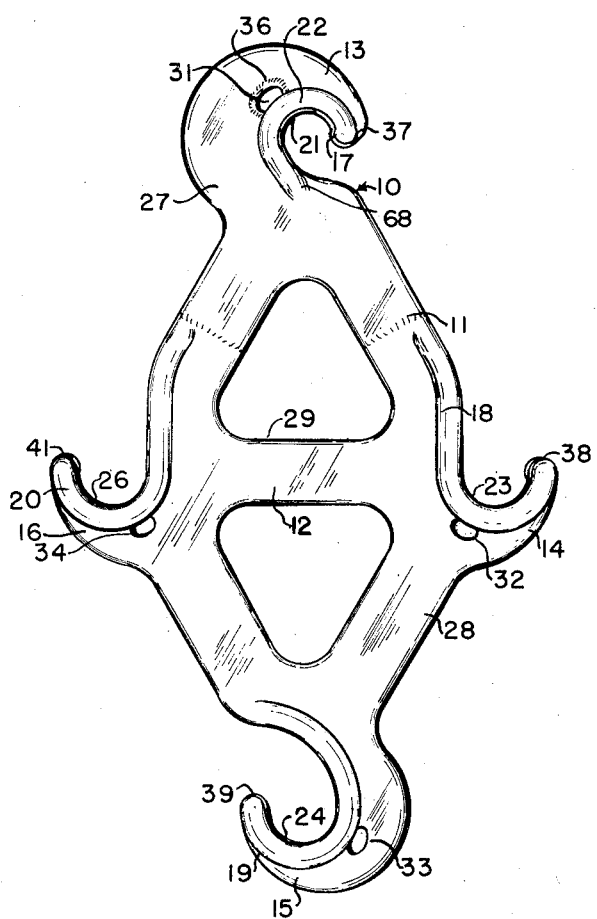
FIG. 1 is a side view of a spacer made to the teachings of our invention.
Figure 2:
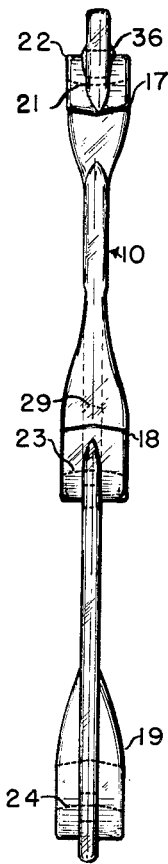
FIG. 2 is an edge wise view of the spacer of FIG. 1.

In FIGS. 1 and 2 the spacer 10 has a generally diamond-shaped flat frame section 11 reinforced by an integral strut or compression member 12 and terminating in an upper, downwardly facing flanged hook 13 and three upwardly facing flanged hooks 14, 15, 16. The spacer 10 is preferably an injection molding of methyl methacrylate polymer but may be an injection molding of other known dielectric materials or it may be compression molded of a reinforced plastic material such, for instance, as glass-reinforced polyester incorporating, preferably, an anti-tracking agent. The spacer 10 may also be molded of a ceramic material such as porcelain or of vitreous aluminum oxide. We prefer methyl methacrylate as a material for spacer 10 because it has high tensile strength and tracking resistance compared to other plastics and is lower in cost and weight and is less fragile than the ceramics.

The hooks 13, 14, 15, 16 have the respective flanges 17, 18, 19, 20 which form seating areas of width greater than the thickness of frame 11. When the spacer 10 is employed for its intended purpose the hook 13 will be hung over a messenger (not shown) and cables which will usually be insulated but may be bare, will be supported in the hooks 14, 15, 16.

The downwardly facing hook 13, and the upwardly facing hooks 14, 15, 16 are saddle-shaped, hook 13 having a center portion 21 lower than the edges 22 of the flange 17 and hooks 14, 15, 16 having respective center portions 23, 24, 26 higher than the edges of the respective flanges 18, 19, 20. The saddle-shaped seats of hooks 13, 14, 15, 16 fit more closely into the natural curves formed by suspended messengers and cables than would semicylindrical surfaces formed by straight flanges.

When the spacer 10 is supported by hook 13 over a messenger the load on the hook 13 is equal to the combined loads on hooks 14, 15 and 16. To accommodate the extra tensile requirements the upper portion 27 of the frame 11 is thicker in section than the lower portion 28 of the frame 11 and then the strut 12. For a like reason the width of the flange 17 of hook 13 is greater than the width of the flanges 18, 19, 20 of hooks 14, 15, 16.

The upper surface 29 of the strut 12 is rounded so as to avoid any flat surface for the accumulation of conducting material which might form a conducting bridge between the cable supported in hook 16 and the cable supported in hook 14.

Flange 17 is blended into that portion of the hook 13 which is an extension of frame 11 so as to leave an elongated aperture 31 through the frame 11. Similarly apertures 32, 33, 34 have been left through the frame 11 adjacent to the respective flanges 18, 19 and 20. Apertures 31, 32, 33, 34 are elongated and have their long axes approximately parallel to the flange. This permits an adequate hole area with the least sacrifice of structural strength. The area of the apertures 31, 32, 33, 34 is great enough to accept more than one turn of tie wire and to offer no hindrance to threading preformed rods if it should be desired to use such rods for fastening the cables to the spacer.

Spacers of the type described herein may be expected to have a tensile strength in excess of 1500 lbs. when the top hook is tested against the three lower hooks. Molding requirements and efficient structural use of material impose a limitation on the thickness of any section of the spacer and the complex shape does not lend itself to exact mathemetical stress anaylsis. Under these circumstances it was surprising to find that relatively large apertures could be left in the structure in such positions that tie wires passed through such apertures would coerce the cables against the body of the spacer.

The aperture 31 is placed in the upper left quadrant of the hook 13 bordering the flange 17. The aperture 32 is placed in the lower left quadrant of the hook 14 bordering the flange 18. The aperture 33 is placed in the lower right quadrant of the hook 15 bordering the flange 19. And the aperture 34 is placed in the lower right quadrant of the hook 16 bordering the flange 20. The aperture 31 is reinforced by a bead or thickened section 36.

The spacer 10 is entirely free from sharp edges and angles. The flanges 17, 18, 19, 20 taper gradually into the frame 11 and all edges are rounded. Blending and filleting of all solid angles eliminates both possible sources of stress concentration, and crevices where dirt might accumulate.

Figure 3:
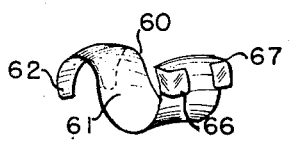
FIG. 3 is a perspective view of a liner used in our invention.
Figure 4:
FIG. 4 is a front view of the liner of FIG. 3.

The extremities 37, 38, 39, 41 of the flanges 17, 18, 19, 20 have thickened sections and form slight protuberances which may be used to anchor liners 60 (FIGS. 3 and 4).

The hook liner 60 shown in FIGS. 3 and 4 is formed from a sheet of abrasion resistant, springy material in a configuration such that it may be clipped into the hooks of the spacer. The material of the liner 60 may be weather-resistant nylon but may also be stainless steel or other suitable substance. The liner 60 has a curvilinear seat 61 matching one of the hooks such as the hook 13. Seat 61 may be saddle-shaped to fit more snugly to the saddle-shape of the flange 17. The material of the liner is turned back on the convex side of the seat in the split clip 62 having lips 63, 64 which snap over the protuberance of the extremity 37 of flange 17. Opposing tabs 66, 67 are folded back of the other end of the seat 61 to engage the lower portion 68 of the flange 17 and so lock the liner 60 into the hook 13.

It is an advantage of the liner 60 that it can be factory-assembled to the spacer 10. Where the use of liners is considered desirable because of the friction induced by excessive windage or other sources of vibration the same liner will fit all sizes of messenger or cable.

We claim:
1. A unitary aerial cable spacer for suspending a plurality of electric cables from a messenger, said spacer being formed from dielectric material and comprising a planar frame, a plurality of flanged hooks integral with said frame and extending outwardly in the plane thereof, one of said hooks being curved downwardly for hanging upon said messenger, and the remainder of said hooks being curved upwardly for supporting said cables, seats formed by said flanged hooks extending across the plane of said frame, said seats being saddle-shaped to conform approximately to the curve of the span of said messenger and cables, said frame being formed with an aperture contiguous to each of said hooks for receiving tying means to hold said messenger and said cables to said spacer.

2. A unitary aerial cable spacer for suspending a plurality of electric cables from a messenger, said spacer being formed from dielectric material and comprising a planar frame, a plurality of flanged hooks integral with said frame and extending outwardly in the plane thereof, one of said hooks being curved downwardly for hanging upon said messenger, and the remainder of said hooks being curved upwardly for supporting said cables, said frame having a lower portion continuous with said upwardly facing hooks and an upper portion thicker in section than said lower portion continuous with said downwardly facing hook, a horizontal compression member integral with said frame said compression member having a rounded upper surface to minimize the collection of conducting particles thereon, seats formed by said flanged hooks extending across the plane of said frame portion, said seats being saddle-shaped to conform approximately to the curve of the span of said messenger and cables, the seat formed by said downwardly facing hook being being wider than the seats formed by said upwardly facing hooks, said frame being formed with an elongated aperture contiguous to each of said hooks, the frame contiguous to said downwardly facing hook being thickened to form a bead around said aperture.

3. A liner for the seat of an aerial cable spacer comprising a sheet of abrasion-resistant material curved approximately S-shaped in profile and formed on opposite sides of its mid point with a concave and a convex surface respectively, one end of said sheet being bifurcated and folded back on said convex surface to form a clip and the other end of said sheet having a plurality of opposing tabs transverse to the length of said sheet, said tabs being folded back on said convex surface whereby said liner may be locked into said seat.

4. The liner of claim 3 wherein said abrasion-resistant material is stainless steel.

5. An aerial cable spacer for suspending a plurality of electric cables from a messenger, said spacer being formed from dielectric material and comprising a planar frame, a plurality of flanged hooks integral with said frame, the flanges of said hooks extending outwardly beyond each side of the plane of said frame, one of said hooks being curved downwardly for hanging upon said messenger, and the remainder of said hooks being curved upwardly for supporting said cables, seats formed by said flanged hooks extending across the plane of said frame, said seats being saddle-shaped to conform approximately to the curve of the span of said messenger and cables, and a seat liner mounted on at least one of said seats, said liner being made of abrasion resistant material and having in profile approximately an S-curvature conforming to the profile of said seat and the end of the hook, said liner being formed with tabs extending around the edges of the flanges of the hooks to the rear surfaces thereof to secure the liner on the seat on which it is mounted, and said frame being formed with an aperture contiguous to each of said hooks for receiving tying means to hold said messenger and cables to said spacer.

References Cited in the file of this patent

UNITED STATES PATENTS

| | | |
|---|---|---|
| 654,983 | Hyde | July 31, 1900 |
| 1,553,244 | Jacobs | Sept. 8, 1925 |
| 1,688,411 | Cook | Oct. 23, 1928 |
| 1,698,531 | Brenizer | Jan. 8, 1929 |
| 2,058,957 | Dalo | Oct. 27, 1936 |
| 2,456,547 | Weber | Dec. 14, 1948 |
| 2,820,083 | Hendrix | Jan. 14, 1958 |
| 2,927,147 | Flower | Mar. 1, 1960 |